(12) United States Patent
Muraishi (10) Patent No.: US 12,355,097 B2
(45) Date of Patent: Jul. 8, 2025

(54) BATTERY PACK AND METHOD FOR PRODUCING THE BATTERY PACK

(71) Applicant: PRIMEARTH EV ENERGY CO., LTD., Kosai (JP)

(72) Inventor: Kousuke Muraishi, Hamamatsu (JP)

(73) Assignee: TOYOTA BATTERY CO., LTD., Shizuoka (JP)

( * ) Notice: Subject to any disclaimer, the term of this patent is extended or adjusted under 35 U.S.C. 154(b) by 780 days.

(21) Appl. No.: 17/683,551

(22) Filed: Mar. 1, 2022

(65) Prior Publication Data

US 2023/0032641 A1  Feb. 2, 2023

(30) Foreign Application Priority Data

Jul. 30, 2021 (JP) ................................. 2021-125478

(51) Int. Cl.
| | |
|---|---|
| *H01M 50/289* | (2021.01) |
| *H01M 10/04* | (2006.01) |
| *H01M 50/209* | (2021.01) |
| *H01M 50/264* | (2021.01) |

(52) U.S. Cl.
CPC ..... *H01M 50/289* (2021.01); *H01M 10/0481* (2013.01); *H01M 50/209* (2021.01); *H01M 50/264* (2021.01)

(58) Field of Classification Search
CPC .. H01M 10/0481; H01M 50/10; H01M 50/20; H01M 50/204; H01M 50/209; H01M 50/264; H01M 50/289; H01M 50/514; H01M 50/531; H01M 50/262

USPC ......................................................... 429/156
See application file for complete search history.

(56) References Cited

U.S. PATENT DOCUMENTS

| | | | |
|---|---|---|---|
| 9,716,256 B2 * | 7/2017 | Noh ..................... | H01M 50/103 |
| 2016/0093849 A1 * | 3/2016 | DeKeuster .......... | H01M 50/209 |
| | | | 429/61 |
| 2020/0028202 A1 * | 1/2020 | Miyoshi ............ | H01M 10/6556 |
| 2021/0083245 A1 * | 3/2021 | Yamazaki ........... | H01M 50/209 |
| 2021/0194034 A1 * | 6/2021 | Morfin ................ | H01M 50/289 |

FOREIGN PATENT DOCUMENTS

| | | | | |
|---|---|---|---|---|
| CN | 104576991 A | * | 4/2015 | ............. H01M 2/10 |
| EP | 3624215 B1 | * | 7/2021 | ............. B60L 50/64 |
| JP | 2012-243534 A | | 12/2012 | |
| JP | 2017-188207 A | | 10/2017 | |
| JP | 2020077482 A | * | 5/2020 | |
| WO | WO-2020174616 A1 | * | 9/2020 | .......... H01M 50/209 |

\* cited by examiner

*Primary Examiner* — Nicole M. Buie-Hatcher
*Assistant Examiner* — Gilberto Ramos Rivera
(74) *Attorney, Agent, or Firm* — Oliff PLC (57) ABSTRACT

A battery pack includes a battery stack including a plurality of battery cells and a case member in which the battery stack is housed. The case member includes an end wall part located on one end of the battery stack in a stacking direction and continuously integrated with a floor part, and a mounting-shape part located on an opposite end from the end wall part and configured to mount a panel-shaped member. The battery stack is retained in the case member while being held by compression between the end wall part and the end panel on the other end. The end panel is pressed against the mounting-shape part in a direction away from the end wall part by compression reaction force of the battery stack, and fixed therein.

6 Claims, 10 Drawing Sheets

BATTERY PACK AND METHOD FOR PRODUCING THE BATTERY PACK

CROSS-REFERENCE TO RELATED APPLICATIONS

This application is based upon and claims the benefit of priority to Japanese Patent Application No. 2021-125478 filed on Jul. 30, 2021, the entire contents of which are incorporated herein by reference.

BACKGROUND

Technical Field

The present disclosure relates to a battery pack including a battery stack consisting of stacked battery cells and a case member housing the battery stack, and a method for producing the battery pack.

Related Art

One example of a conventional battery pack is disclosed in Japanese unexamined patent application publication No. 2012-243534. In the battery pack of this publication, end plates are placed at both ends of a battery stack in a stacking direction in which battery cells are stacked to constitute the battery stack, and the end plates are connected to each other by binding bars. Each binding bar is provided with an extendable mechanism that can expands and contracts in the stacking direction of the battery cells, so that the extendable mechanism of each binding bar can be fixed at any position. This secures the battery pack under an appropriate pressure even when battery stacks have individual differences in the length in the stacking direction.

SUMMARY

Technical Problems

The above-mentioned conventional art has a problem of high production costs of battery packs. Specifically, this is because, for example, if the binding bar is configured with the extendable function to absorb individual differences in the length of the battery stacks in the stacking direction, this configuration needs parts for enabling the extendable function and parts for locking the extendable function after adjusting the extendable function, resulting in the increased number of parts of a battery pack. Furthermore, as the number of parts increases, adjustment and assembly processes for those parts are also apt to be complicated.

The present disclosure has been made to address the above problems and has a purpose to provide a battery pack with reduced production costs and a method for producing the battery pack.

Means of Solving the Problems

To achieve the above-mentioned purpose, one aspect of the present disclosure provides a battery pack comprising: a battery stack including a plurality of battery cells stacked one on another; a case member in which the battery stack is housed, the case member including: a floor part located under the battery stack; an end wall part located on one end in a stacking direction of the battery cells, the end wall part being continuously integrated with the floor part; and a mounting-shape part located on an end opposite from the end wall part, the mounting-shape part being configured to mount a panel-shaped member; and an end panel, which is the panel-shaped member, mounted in the mounting-shape part, the battery stack being retained in the case member while being held by compression between the end wall part and the end panel, and the end panel being pressed against the mounting-shape part in a direction away from the end wall part by compression reaction force of the battery stack, so that the end panel is fixed in the mounting-shape part.

In the battery pack configured as above, the battery stack and the end panel are fixed by the compression reaction force of the battery stack that is held by compression. Specifically, for example, the battery pack in the present aspect needs no means for fastening or bonding to fix the end panel, and thus this battery pack can be produced at low costs.

Another aspect of the present disclosure provides a method for producing a battery pack, the battery pack comprising a battery stack including a plurality of battery cells and a case member in which the battery stack is housed, the case member including: a floor part located under the battery stack; an end wall part located on one end in a stacking direction of the battery cells, the end wall part being continuously integrated with the floor part; and a mounting-shape part located on an end opposite from the end wall part, the mounting-shape part being configured to mount a panel-shaped member, wherein the method comprises: inserting the battery stack into the case member while compressing the battery stack in the stacking direction, and pressing one end of the battery stack in the stacking direction against the end wall part, and; mounting the end panel in the mounting-shape part; and releasing the battery stack from the compressing to allow an opposite end of the battery stack in the stacking direction to press against the end panel so that: the battery stack is housed in the case member while being held by compression between the end wall part and the end panel, and the end panel is pressed against the mounting-shape part in a direction away from the end wall part by compression reaction force of the battery stack, and is fixed in the mounting-shape part.

According to the method for producing a battery pack in the foregoing aspect, the battery stack and the end panel can be fixed by the compression reaction force of the battery stack held by compression. Specifically, for example, the above method does not need fastening or welding to fix the end panel, and thus this method can produce the battery pack at low costs.

The present disclosure can achieve a battery pack with reduced production costs and a method for producing the battery pack.

DETAILED DESCRIPTION OF THE EXEMPLARY EMBODIMENTS

Figure 1:
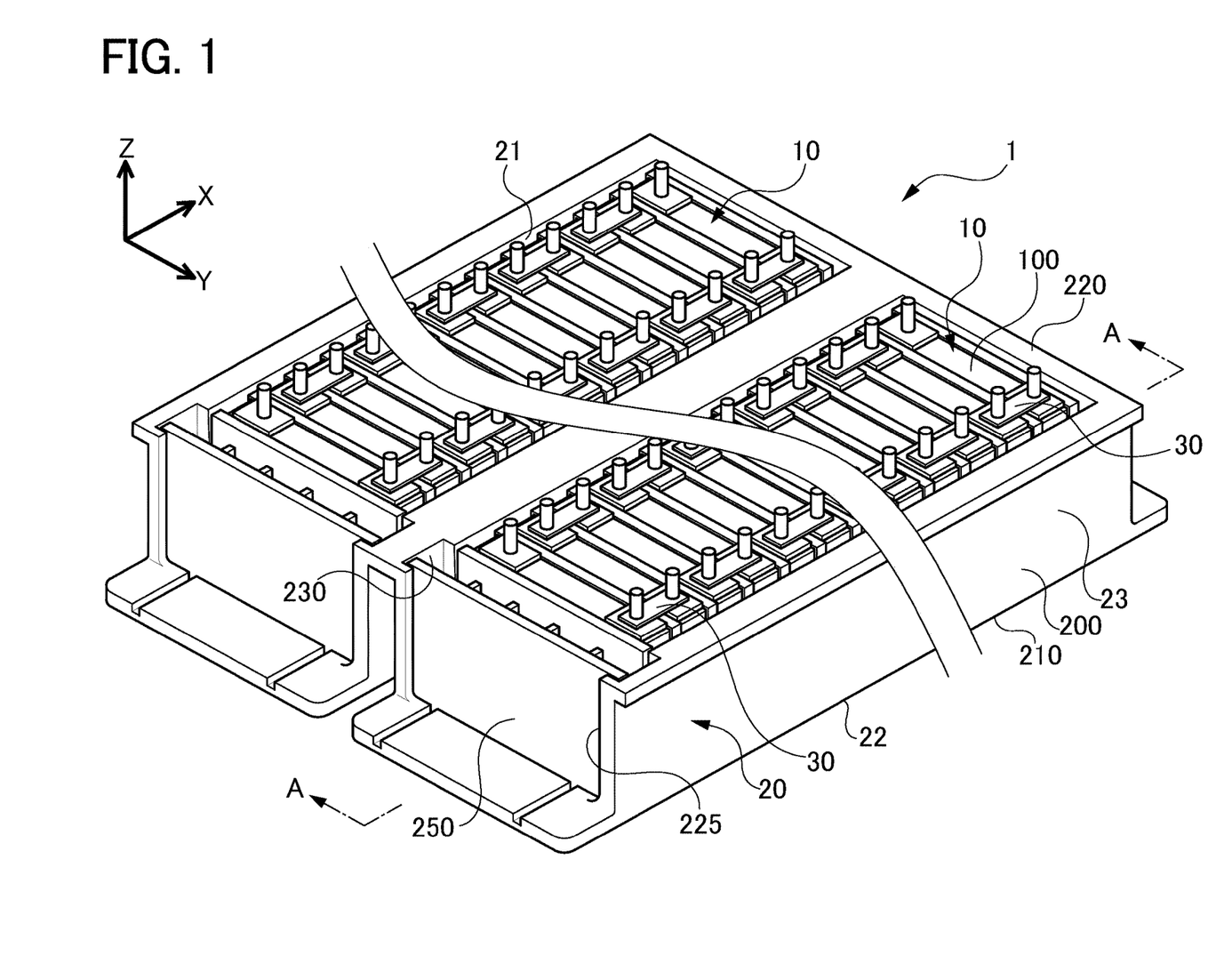
FIG. 1 is an external perspective view of a battery pack in an embodiment.

A detailed description of an embodiment of the present disclosure will now be given referring to the accompanying drawings. In the present embodiment, the present disclosure is embodied in a battery pack 1, the entire configuration of which is shown in FIG. 1. The battery pack 1 in FIG. 1 includes battery stacks 10 and a battery case 20 in which the battery stacks 10 are housed.

Each battery stack 10 is configured including a plurality of rectangular battery cells 100. The battery cells 100 in each battery stack 10 are stacked one on another in a direction X in FIG. 1, which is also referred to as a stacking direction. The battery cells 100 in FIG. 1 are illustrated with the width and the height respectively matched with a direction Y and a direction Z. The battery pack 1 in the present embodiment includes two battery stacks 10 arranged side by side in the direction Y. The direction X and the direction Y are horizontal directions, and the direction Z is a vertical direction.

A battery case 20 includes a bottom part 22 located under the battery stacks 10 and side walls 23 extending upward from the bottom part 22, and has a box-shaped configuration having an open upper side. The battery case 20 is provided with two housing spaces 21, which are surrounded and formed by the bottom part 22 and the side walls 23. The two battery stacks 10 are housed one by one in those housing spaces 21.

The battery case 20 is constituted of a case member 200 and an end panel 250 assembled to the case member 200. The case member 200 includes a floor part 210 forming the bottom part 22. The case member 200 further includes an end wall part 220 forming one of the side walls 23, located on one end in the stacking direction of the battery cells 100 of the battery stacks 10. The floor part 210 and the end wall part 220 constitute a part of the case member 200, and are continuously integrated with each other.

The case member 200 is provided with an opening 225 at the end opposite from the end wall part 220 in the stacking direction of the battery cells 100 of each battery stack 10. The case member 200 is provided, in the edge of the opening 225, with a mounting part 230. In this mounting part 230 provided at the opening 225 of the case member 200, the end panel 250 is mounted. The details of the mounting part 230 will be described later. The end panel 250 mounted in the mounting part 230 closes the opening 225 of the case member 200. Depending on the actual situation where the battery pack 1 is used, a cover member or the like may be attached to cover the upper side of the battery pack 1.

Figure 2:
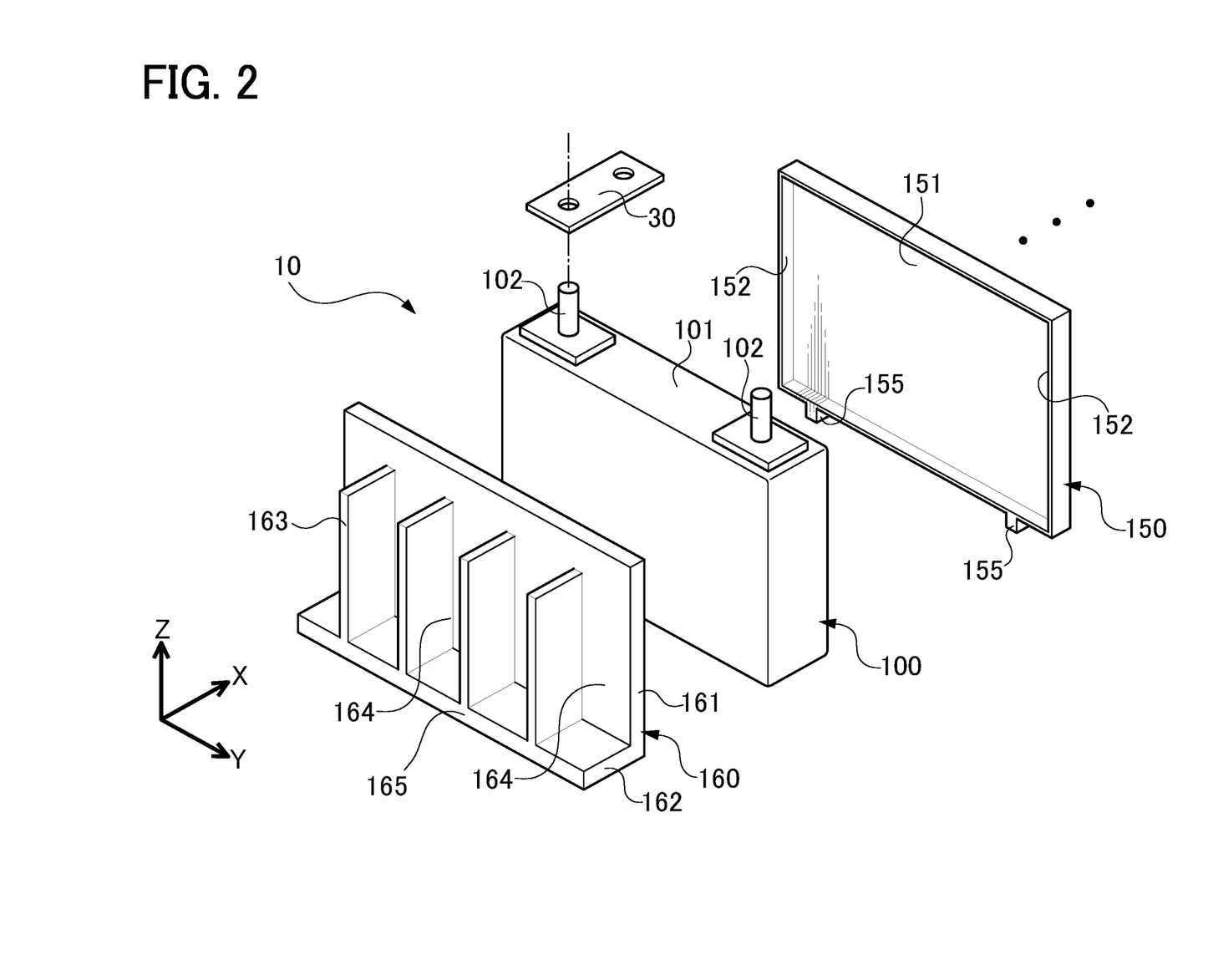
FIG. 2 is an exploded perspective view of a battery stack constituting the battery pack.

FIG. 2 is an exploded view of the battery stack 10. The battery stack 10 includes the battery cells 100, spacers 150, and an end plate 160. Each of the battery cells 100 in the present embodiment includes an outer casing made of electrically-conductive metal. Each battery cell 100 is provided, on its upper surface 101, with two pole terminals 102. One of the pole terminals 102 is a positive electrode, and the other is a negative electrode.

The spacers 150 are made of an insulating material; for example, made of insulating resin. As this material of the spacers 150, a material with high thermal conductivity is preferable to improve the heat dissipation of each battery cell 100. Each spacer 150 is provided with a recessed portion 151 on the side facing the battery cell 100. Each spacer 150 includes inner wall surfaces 152 defining the recessed portion 151, the inner wall surfaces 152 being located at both ends in the width direction of the battery cell 100. When the battery cell 100 is fitted in the recessed portion 151 of the spacer 150, the battery cell 100 and the spacer 150 are assembled to each other.

The battery cell 100 assembled to the spacer 150 contacts the inner wall surfaces 152 of the spacer 150, so that the battery cell 100 and the spacer 150 are positioned to each other in the width direction. In each battery stack 10, a plurality of assemblies each including one battery cell 100 and one spacer 150 are arranged in the X direction. Thus, the battery cells 100 in each battery stack 10 are insulated from each other. Each spacer 150 is provided, at its lower end, with two aligning protrusions 155. These two aligning protrusions 155 are spaced from each other in the width direction. FIG. 2 shows the battery cell 100 and the spacer 150, which are located closest to the end panel 250, in the battery pack 1.

The end plate 160 is located closer to the end panel 250, compared to the closest one of the battery cells 100 to the end panel 250 in the battery stack 10, as shown in FIG. 2. The end plate 160 also may be made of the same material as the spacers 150. The end plate 160 is an L-shaped member including a facing part 161 and a bottom part 162. The facing part 161 extends upward from the bottom part 162 along the outer surface of the opposite battery cell 100. The end plate 160 further includes a plurality of ribs 163 connected to the facing part 161 and the bottom part 162. A space 164 is formed between the adjacent ribs 163 and formed outside the ribs 163 located at both ends in the width direction.

FIG. 2 shows a busbar 30 for electrically connecting the pole terminals 102 of the adjacent battery cells 100. In the battery pack 1, busbars 30 are connected to every battery cell 100 as shown in FIG. 1. In the battery pack 1, therefore, it is desirable that the pole terminals 102 of the adjacent battery cells 100 are aligned in the direction X, i.e., the stacking direction of the battery cells 100. Specifically, the position of each pole terminal 102 in the width direction is preferably constant in all of the battery cells 100 in the battery pack 1. This is because proper alignment of the pole terminals 102 in the stacking direction enables easy and appropriate connection of the pole terminals 102 with the bus bars 30.

Figure 3:
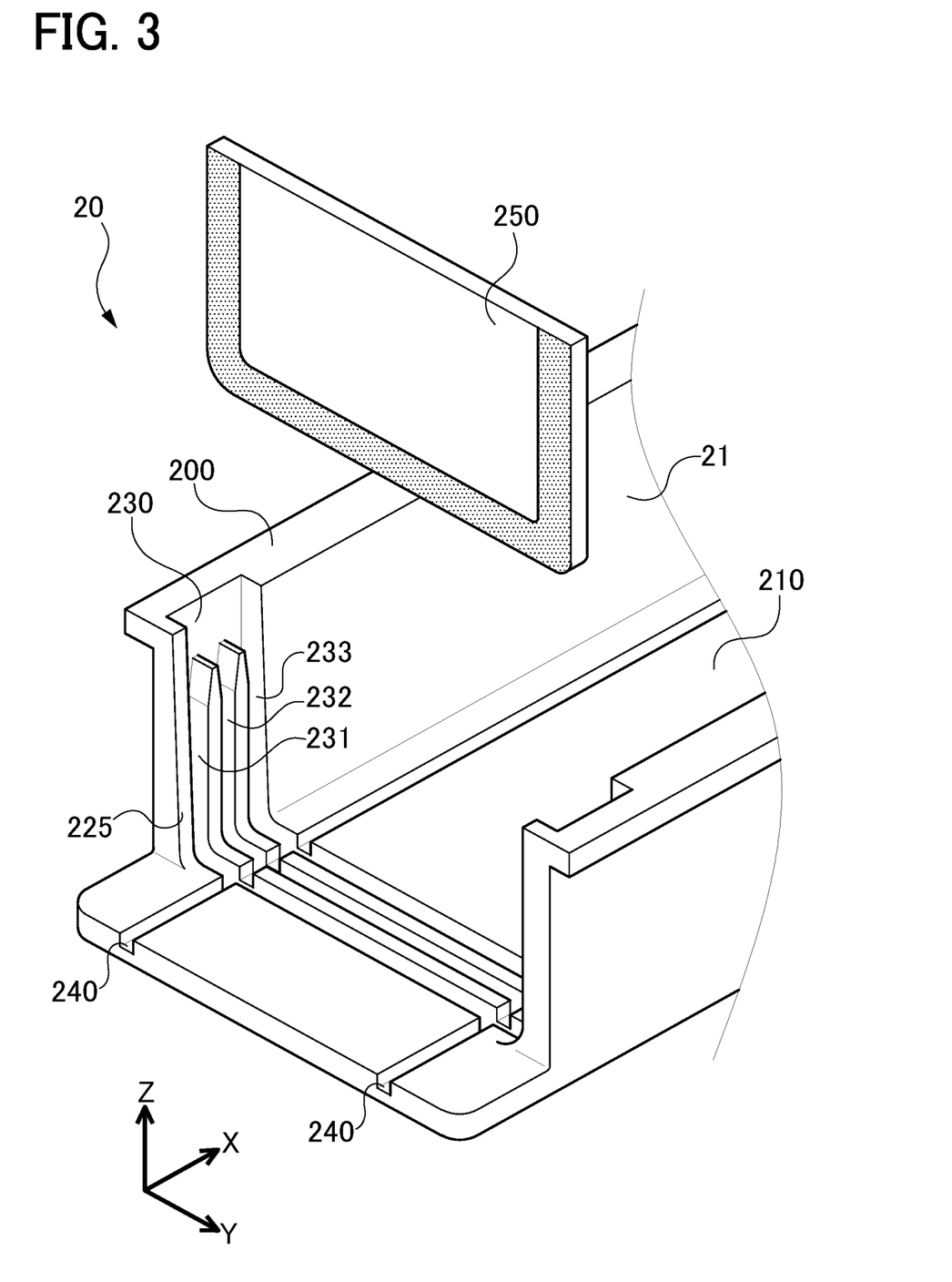
FIG. 3 is an exploded perspective view of a battery case constituting the battery pack.

FIG. 3 is an exploded perspective view of the battery case 20, showing a mounting part 230 of the case member 200 together with the end panel 250 in an enlarged view. The mounting part 230 of the case member 200 is formed with three grooves along the edge of the opening 225. These three grooves are arranged at intervals in the stacking direction of the battery cells 100. These grooves are referred to as a first mounting-shape part 231, a second mounting-shape part 232, and a third mounting-shape part 233 in order closer to the opening 225. These mounting-shape parts 231 to 233 each have a width enough to allow insertion of the end panel 250.

The end panel 250 is a flat panel-shaped member. The end panel 250 is inserted from above into one of the first, second, and third mounting-shape parts 231, 232, and 233, and is mounted in the mounting part 230. In FIG. 3, a part of the end panel 250 is hatched with dots, which is to be pressed against the mounting part 230. For example, if it is desired to prevent water from entering in the battery pack 1, an elastic sealing member can be provided on the hatched portion of the end panel 250. This configuration can enhance the water resistance of the battery pack 1.

On the upper surface of the floor part 210 of the case member 200, there are formed two aligning grooves 240 extending in the stacking direction of the battery cells 100 of each battery stack 10. Specifically, the aligning grooves 240 each extend from the end of the floor part 210 near the opening 225 to the end wall part 220. The aligning grooves 240 each have a width corresponding to each aligning protrusion 155 of the spacers 150 and are spaced at an interval corresponding to the interval between the aligning protrusions 155 of each spacer 150 in the direction Y.

Figure 4:
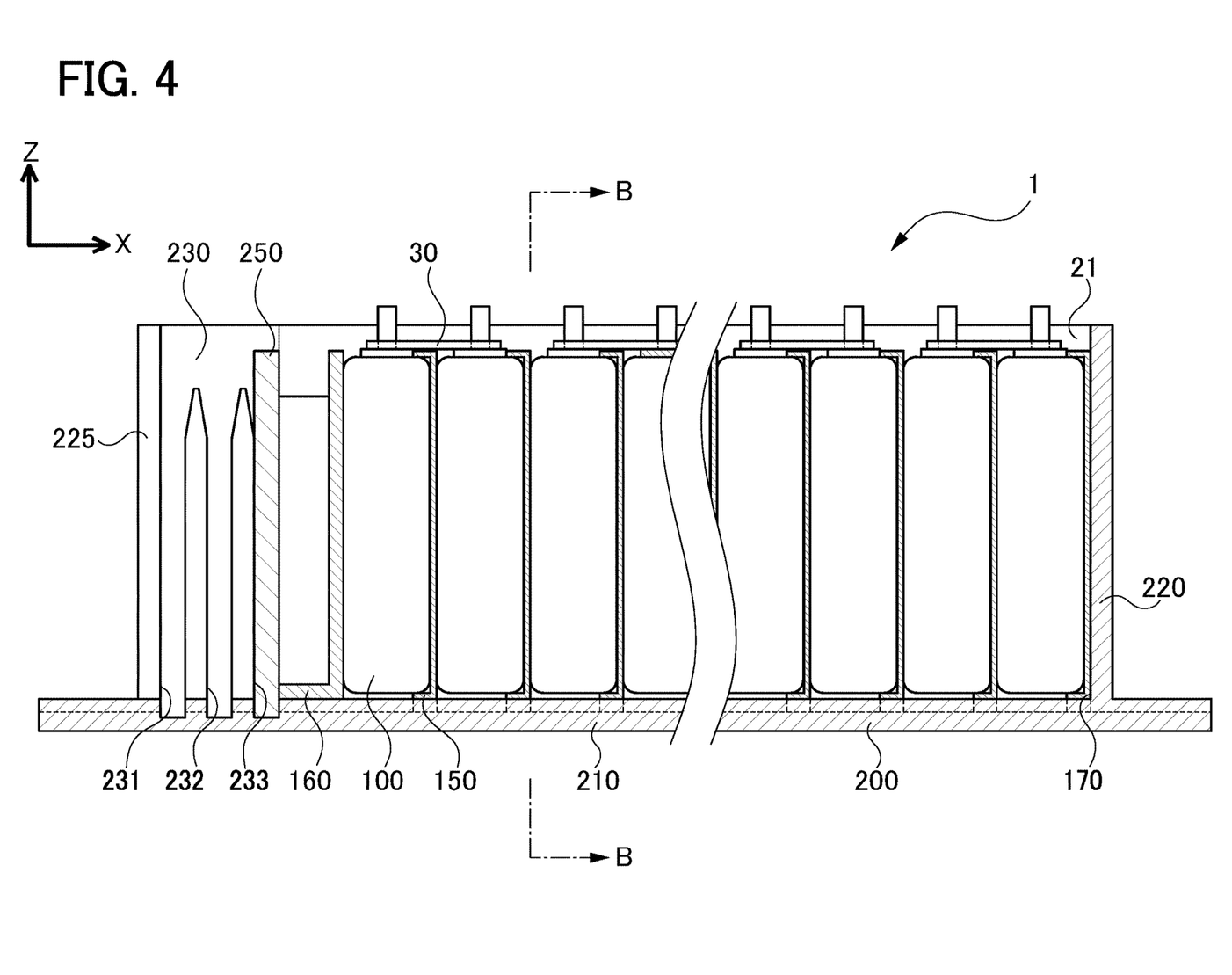
FIG. 4 is a cross-sectional view (A-A in FIG. 1) in a stacking direction of battery cells of the battery pack.

FIG. 4 is a cross-sectional view of the battery pack 1 in the stacking direction of the battery cells 100, taken along A-A in FIG. 1. As shown in FIG. 4, the end plate 160 is placed on one end of the battery stack 10 close to the end panel 250 in the stacking direction. Further, an end plate 170 is placed on the opposite end of the battery stack 10 close to the end wall part 220 in the stacking direction. The end plate 170 in the present embodiment is positioned with the adjacent battery cell 100 and includes protrusions identical to the aligning protrusions 155 of each spacer 150.

In the battery pack 1 shown in FIG. 4, the end panel 250 is mounted in the third mounting-shape part 233 of the mounting part 230. In this state, the battery stack 10 in the battery pack 1 is compressed in the stacking direction. In other words, the length of the battery stack 10 in the stacking direction after being assembled in the battery pack 1 is shorter than that the battery stack 10 in an uncompressed state before being assembled in the battery pack 1. The battery stack 10 held by compression as above generates a compression reaction force, causing the end plates 160 and 170 located at either end of the battery stack 10 to respectively press against the end panel 250 and the end wall part 220 in a direction to move the end panel 250 and the end wall part 220 away from each other.

The end panel 250 mounted in the third mounting-shape part 233 is pressed against this mounting-shape part 233 in a direction away from the end wall part 220. Specifically, the end panel 250 is pressed against an inner wall of the third mounting-shape part 233 having a groove shape, located on the opposite side from the end wall part 220, that is, a left inner wall surface 233b in FIG. 4. This pressuring of the end panel 250 by the compression reaction force of the battery stack 10 generates a strong frictional force between the end panel 250 and the third mounting-shape part 233. This frictional force prevents the end panel 250 from moving in a direction of coming off the third mounting-shape part 233, i.e., in an upward direction. Therefore, the end panel 250 is fixed to the third mounting-shape part 233. In this embodiment, the case member 200 and the end panel 250 are subjected to the compression reaction force of the battery stack 10. Accordingly, the case member 200 and the end panel 250 may be made of any material that can withstand the compression reaction force while appropriately compressing the battery stack 10.

The battery pack 1 configured as above in the present embodiment needs no special fastening or bonding to fix the end panel 250. This configuration can reduce the production cost of the battery pack 1. Further, as described above, a sealing member may be provided on the part of the end panel 250 which contacts the third mounting-shape part 233, so that the compression reaction force of the battery stack 10 enhances the water sealing property of that part. In other words, the waterproof property of the battery pack 1 can be improved even without e.g., bonding the end panel 250 to the case member 200.

Figure 5:
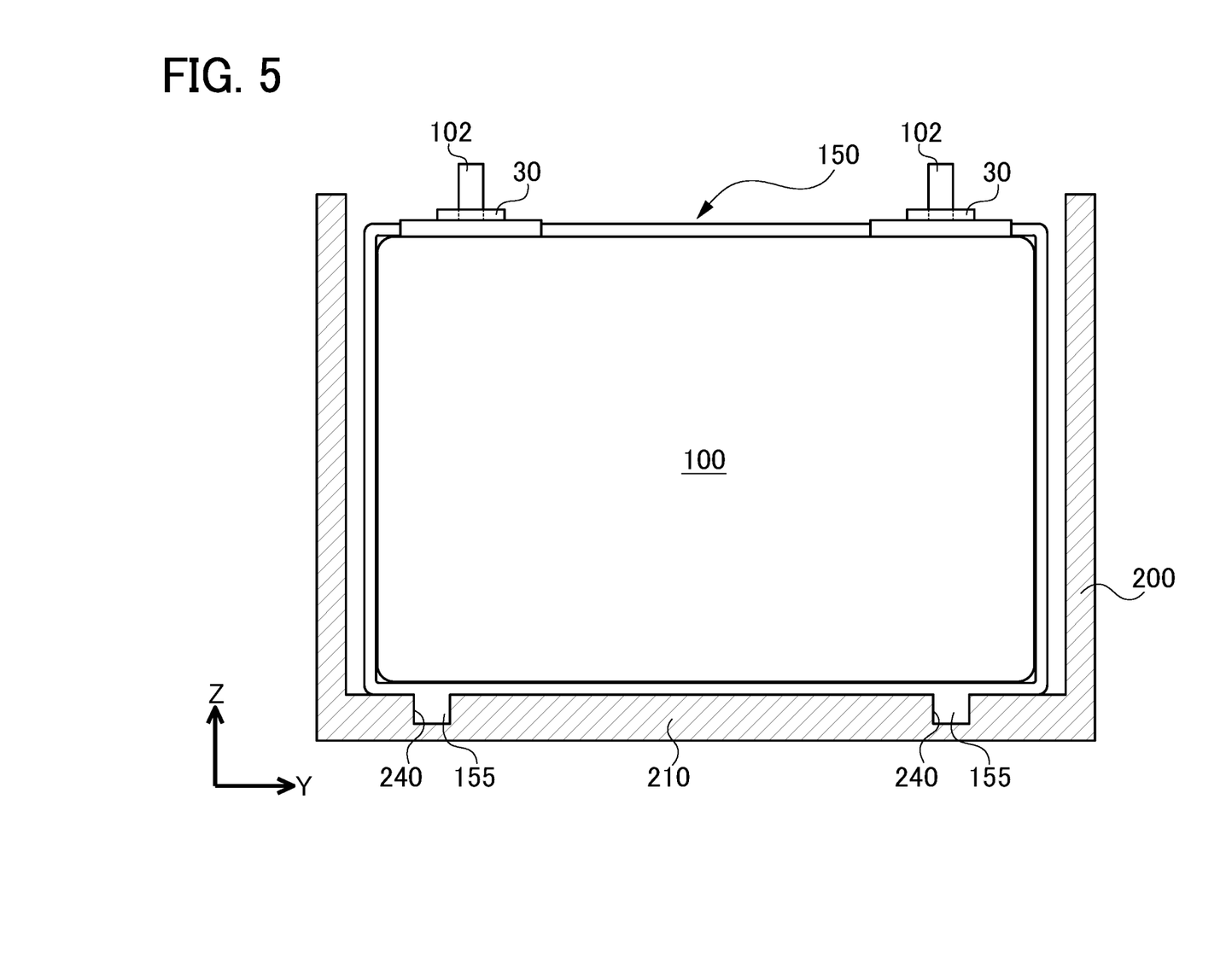
FIG. 5 is a cross-sectional view (B-B in FIG. 4) in a width direction of the battery pack.

FIG. 5 is a cross-sectional view of the battery pack 1 in the width direction of the battery cells 100, taken along B-B in FIG. 4. As shown in FIG. 5, the two aligning protrusions 155 provided at the lower end of each spacer 150 are individually engaged in the two aligning grooves 240 provided in the upper surface of the floor part 210 of the case member 200. Therefore, the positions of the spacers 150 of the battery stack 10 in the width direction, namely, in the direction Y in FIG. 5, are coincident with each other, relative to the case member 200. Further, the positions of the battery cells 100 attached to the spacers 150 in the width direction are also constant relative to the case member 200. Thus, in each battery stack 10 of the battery pack 1, the pole terminals 102 of the adjacent battery cells 100 are aligned in the stacking direction. The aligning grooves 240 provided in the floor part 210 therefore function as an aligning-shape part for aligning the battery cells 100 of the battery stack 10 in the stacking direction. Moreover, each of the spacers 150 including the aligning protrusions 155 functions as an engagement member that can engage with the aligning grooves 240. The spacers 150 are one example of the engagement member of the present disclosure.

Next, a method for producing the battery pack 1 in the present embodiment will be described below. In the present embodiment, for producing the battery pack 1, the battery stacks 10 are first inserted in the case member 200, and then the end panels 250 are assembled in the case member 200. Since the battery stacks 10 are identical in configuration, the following explanation will be given to only one of the battery stacks 10 for convenience.

Figure 6:
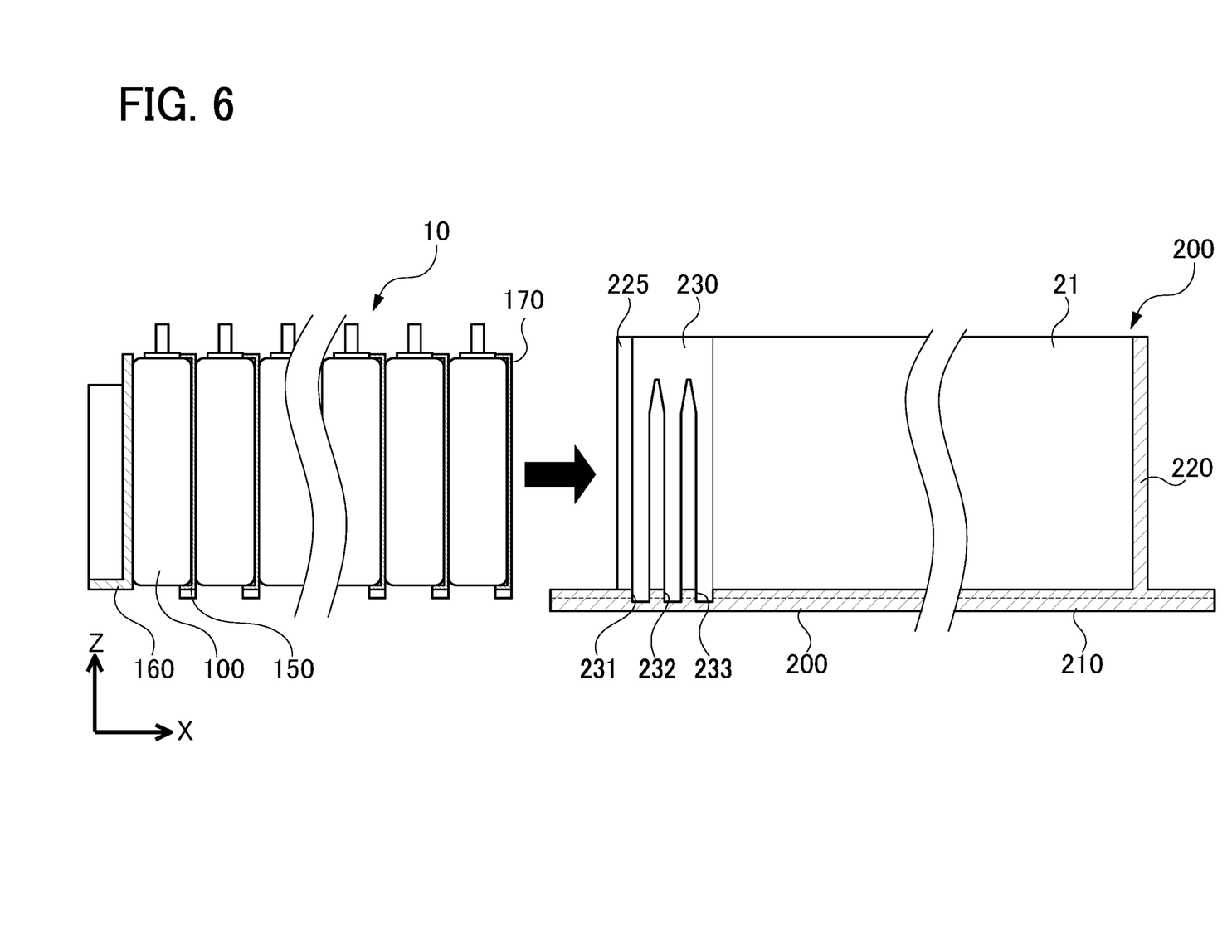
FIG. 6 is an explanatory view showing a process of inserting the battery stack into a case member.

FIG. 6 is a schematic diagram showing a process of inserting the battery stack 10 into the case member 200. This battery stack 10 is made by stacking of a plurality of assemblies each including one battery cell 100 and one spacer 150 in advance of insertion into the case member 200. In the present embodiment, the end plate 160 is stacked on the battery stack 10 at the end to be located close to the end panel 250 in the stacking direction of the battery stack 10, i.e., battery cells 100. Then, as shown in FIG. 6, the battery stack 10 is inserted into the case member 200 from the end plate 170 on the opposite side from the end plate 160.

For example, insertion of the battery stack 10 into the case member 200 can be performed by moving at least either the battery stack 10 or the case member 200 while holding the battery stack 10 with a chuck device that clamps the battery stack 10 in the width direction or the vertical direction. The case member 200 may be provided with a relief part to avoid interference with the chuck device that holds the battery stack 10, if necessary.

Figure 7:
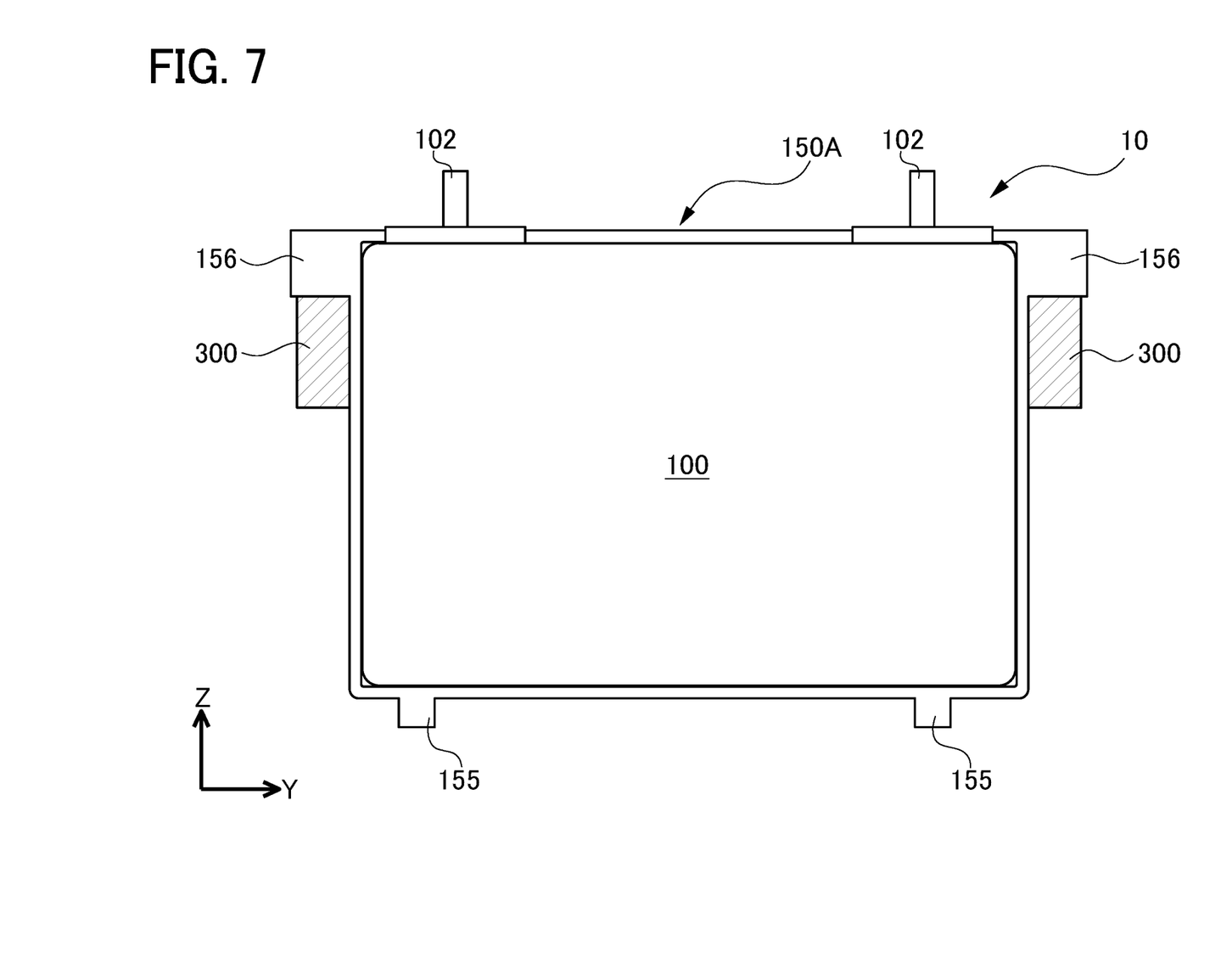
FIG. 7 is an explanatory view showing a concrete example of inserting the battery stack into the case member.

FIG. 7 shows a concrete example of the spacers 150 adapted for clamping of the battery stack 10 in the width direction to insert battery stack 10 into the case member 200. Specifically, a spacer 150A in FIG. 7, which is the concrete example, is provided with protruding portions 156 overhanging outward from both sides in the width direction. When this spacer 150A is employed, the battery stack 10 can be held by chuck jaws 300 as shown in FIG. 7. The chuck claws 300 support the protruding portions 156 from below and clamp the battery stack 10 in the width direction under the protruding portions 156. Thus, the battery cells 100 of the battery stack 10, which are loaded and aligned in the stacking direction in advance in an equipment provided with the chuck claws 300, can be inserted into the case member 200.

To be specific, the battery stack 10 is inserted into the housing space 21 of the case member 200 by passing through the opening 225 of the case member 200 while making the lower surface of the battery stack 10 slide along the floor part 210. This operation of inserting the battery stack 10 into the case member 200 is continued, for example, until the end plate 170 comes into contact with the end wall part 220.

The aligning protrusions 155 of the spacers 150 protrude downward from the bottom of the battery stack 10. Thus, when the battery stack 10 is to be inserted in the case member 200, the aligning protrusions 155 are fitted in the aligning grooves 240. Thereafter, as the battery stack 10 is being moved to a deeper side of the housing space 21 of the case member 200, the aligning protrusions 155 are moved while being guided by the aligning grooves 240.

Figure 8:
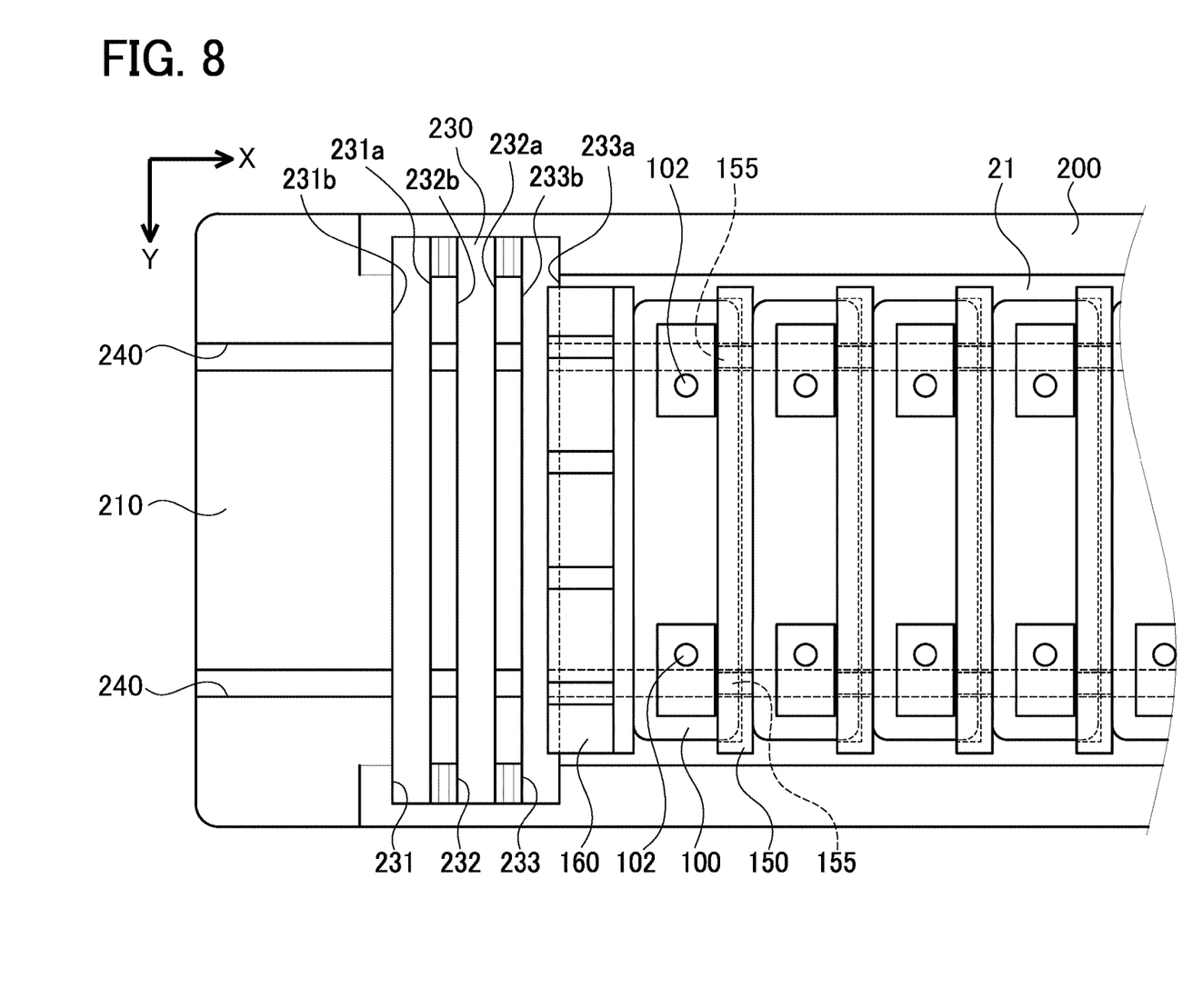
FIG. 8 is an explanatory view showing a battery stack aligned in the case member.

FIG. 8 is a plan view of the battery stack 10 inserted in the case member 200. Since the battery stack 10 is inserted in the case member 200 with the aligning protrusions 155 guided by the aligning grooves 240, as shown in FIG. 8, the positions of the battery cells 100 in the width direction are constant. That is, the battery cells 100 are aligned in the stacking direction. Thus, the pole terminals 102 of the adjacent battery cells 100 are also aligned in the stacking direction.

As shown in FIG. 8, the battery stack 10 in an uncompressed state, which is merely inserted in the case member 200, overlaps and conceals at least one of the first mounting-shape part 231, the second mounting-shape part 232, and the third mounting-shape part 233. In FIG. 8, concretely, the third mounting-shape part 233 is partly hidden under, i.e., covered by, the battery stack 10.

Figure 9:
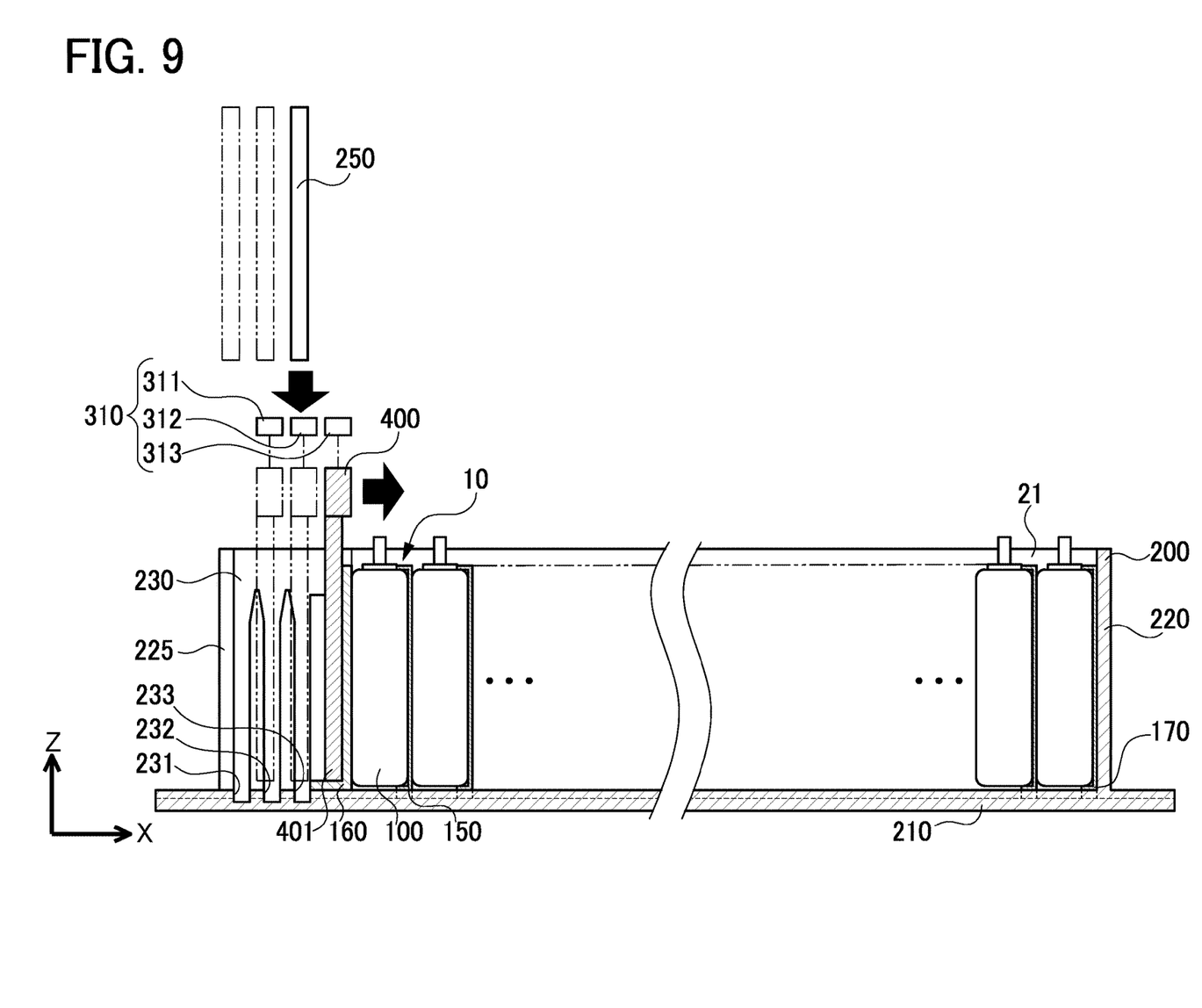
FIG. 9 is an explanatory view showing a process of mounting an end panel while compressing the battery stack.

FIG. 9 is an explanatory diagram showing a process of assembling the end panel 250. This assembling of the end panel 250 is performed while compressing the battery stack 10 in the stacking direction. In the present embodiment, the battery stack 10 is compressed by a pressing device including a pressing unit 400 for pressing the end plate 160. The pressing unit 400 includes a distal end portion 401 (i.e., a lower end portion in the figure) having a shape that can be inserted in the spaces 164 (e.g., a comb-like shape) without interfering with the ribs 163. This pressing unit 400 is pressed against the end plate 160 as shown in FIG. 9.

Specifically, the battery stack 10 is moved forward by the pressing unit 400 from the side of the the mounting part 230 toward the end wall part 220. Accordingly, the battery stack 10 is compressed in the stacking direction while the end plate 170 on the opposite side from the pushed side of the battery stack 10 is pressed against the end wall part 220. In the present embodiment, the battery stack 10 is compressed by the pressing unit 400 under a predetermined constant pressure. During this compressing process, each battery cell 100 and others of the battery stack 10 are moved toward the end wall part 220. However, the battery cells 100 will not out of alignment because the aligning protrusions 155 of the spacers 150 and the aligning grooves 240 of the case member 200 engage with each other.

Herein, the components of each battery stack 10, such as the battery cells 100 and the spacers 150, have individual differences in length in the stacking direction. When such battery cells 100 and spacers 150 having individual differences are stacked in layers to make up each battery stack 10, the battery stacks 10 are apt to differ in length from each other in the stacking direction.

For the above reason, the position of the pressing unit 400 that compresses the battery stack 10 under a constant pressure may differ depending on the battery stacks 10. In the present embodiment, therefore, the position of the pressing unit 400 that compresses the battery stack 10 in the stacking direction is detected by a detecting unit 310. This detecting unit 310 includes a first detecting part 311, a second detecting part 312, and a third detecting part 313, which are arranged in the order far from the end wall part 220.

The first detecting part 311 detects the pressing unit 400 when an end of the end plate 160 of the battery stack 10 under compression, the end being a contact surface 165 which contacts the end panel 250, is located closer to the end wall part 220 relative to a right inner wall surface 231a of the first mounting-shape part 231 and also closer to the opening 225 relative to the right inner wall 232a surface of the second mounting-shape part 232. The second detecting part 312 detects the pressing unit 400 when the end of the end plate 160 of the battery stack 10 under compression is located closer to the end wall part 220 relative to the right inner wall surface 232a of the second mounting-shape part 232 and also closer to the opening 225 relative to a right inner wall surface 233a of the third mounting-shape part 233. The third detecting part 313 detects the pressing unit 400 when the end of the end plate 160 of the battery stack 10 under compression is located closer to the end wall part 220 relative to the right inner wall surface 233a of the third mounting-shape part 233.

Then, depending on a detection state of the detecting unit 310, the end panel 250 is inserted from above and assembled into the mounting part 230. Specifically, when the first detecting part 311 is in the detection state, the end panel 250 is assembled into the first mounting-shape part 231. When the second detecting part 312 is in the detection state, the end panel 250 is assembled into the second mounting-shape part 232. When the third detecting part 313 is in the detection state, the end panel 250 is assembled into the third mounting-shape part 233. In other words, the end panel 250 is mounted at the position where the interval between the end plate 160 of the battery stack 10 in a compressed state and the end panel 250 is smallest. In FIG. 9, the third detecting part 313 of the detecting part 310 is in the detection state and thus the end panel 250 is assembled to the third mounting-shape part 233.

Subsequently, the pressing unit 400 is pulled out upwardly, releasing the battery stack 10 from compression by the pressing unit 400. The battery stack 10 released from the compression thus expands in the stacking direction. A difference in the total length of the battery stack 10 in the stacking direction in the present embodiment between in the compressed state and in the uncompressed state is larger than the pitch of the first mounting-shape part 231, the second mounting-shape part 232, and the third mounting-shape part 233. This pitch indicates a distance between the adjacent mounting-shape parts 231, 232, and 233, that is, respective left inner wall surfaces 231b, 232b, and 233b. Furthermore, the battery stack 10 having the shortest total length in the uncompressed state is longer than the distance from the end wall part 220 to the left inner wall surface 233b of the third mounting-shape part 233. Therefore, the battery stack 10 is inserted between the end wall part 220 and the end panel 250, which are spaced by a distance shorter than the overall length of the battery stack 10 in the uncompressed state.

As described above, before the battery stack 10 is compressed in the stacking direction, at least a part of the first mounting-shape part 231, the second mounting-shape part 232, or the third mounting-shape part 233, in which the end panel 250 is to be finally assembled, is hidden, i.e., covered, by the uncompressed battery stack 10. Then, the battery stack 10 is compressed until the part of the first mounting-shape part 231, the second mounting-shape part 232, or the third mounting-shape part 233, corresponding to the final mounting position of the end panel 250 is exposed, i.e., uncovered. Subsequently, the end panel 250 is mounted in the corresponding mounting-shape part 231, 232, or 233, and then the battery stack 10 is released from the compression by removal of the pressing unit 400. Accordingly, the end plate 160 of the battery stack 10 released from the compression comes into contact with the end panel 250. The battery pack 1 is thus produced. The battery stack 10 of the battery pack 1 is then subjected to attachment of the bus bars 30 and other assembly operations.

Even after the battery stack 10 released from the compression expands to restore from the compressed state until coming into contact with the end panel 250, the battery stack 10 is still in a somewhat compressed state as compared to the uncompressed state. Accordingly, the battery stack 10 of the battery pack 1 is held by compression between the end wall part 220 and the end panel 250. The battery stack 10 is thus retained in the housing space 21 of the battery case 20. In this state, the end panel 250 in the battery pack 1 is pressed against the third mounting-shape part 233, concretely, its left inner wall surface 233b in FIG. 8, in a direction away from the end wall part 220 by the compression reaction force of the battery stack 10 somewhat compressed as above. This prevents for example the end panel 25 from coming off the third mounting-shape part 233. Therefore, the battery stack 10 and the end panel 250 are appropriately prevented from dropping out of the case member 200. In other words, no special fastening or bonding is required to fix the battery stack 10 and the end panel 250.

In the battery pack 1, the case member 200 is provided with three grooves configured to receive the end panel 250; namely, the first mounting-shape part 231, the second mounting-shape part 232, and the third mounting-shape part 233. The end panel 250 is assembled to an appropriate one of the first, second, and third mounting-shape parts 231, 232, and 233, so that the end panel 250 is adequately subjected to the compression reaction force of the battery stack 10. For assembling of the end panel 250, there is no need for complicated positioning according to individual differences between the battery stacks 10, nor for a complicated mechanism for the positioning. Consequently, the battery pack 1 can be manufactured at low costs even when the battery stacks 10 with large individual differences constitute the battery pack 1.

The plurality of battery cells 100 in the battery stack 10 are aligned in the stacking direction since the aligning protrusions 155 of each spacer 150 are fitted in the aligning grooves 240 of the case member 200. Aligning the battery cells 100 is performed at the inserting of the battery stack 10 into the case member 200 before the end panel 250 is assembled to the case member 200. The battery stack 10 with the battery cells 100 remained in alignment is compressed and then the end panel 250 is assembled. Even if the battery stack 10 moves due to compression, the battery cells 100 are prevented from coming out of alignment. Furthermore, even after the end panel 250 is assembled, the battery stack 10 compressed is prevented from moving the aligned battery cells 100. In other words, the plurality of battery cells 100 are properly aligned with a simple structure. For this alignment of the battery cells 100, no special process and the like is required. In addition, since the battery cells 100 are aligned, the bus bars 30 can be attached afterwards accurately without causing bonding or fastening failures. Consequently, the battery pack 1 with the battery cells 100 aligned properly can be produced at low costs.

According to the present embodiment described in detail as above, the case member 200 used therein includes the floor part 210, the end wall part 220, and the mounting part 230. The floor part 210 is located under the battery stack 10. The end wall part 220 is located on one end of the battery stack 10 in the stacking direction and is continuously integrated with the floor part 210. The mounting part 230 is located on the opposite end from the end wall part 220 and is formed with the third mounting-shape part 233 in which the panel-shaped end panel 250 is mounted. The battery stack 10 is then compressed in the stacking direction until one end of the battery stack 10 in the stacking direction is pressed against the end wall part 220. Subsequently, the end panel 250 is mounted in the third mounting-shape part 233. The battery stack 10 is then released from compression, so that the other end of the battery stack 10 in the stacking direction comes into contact with the end panel 250. Accordingly, the battery stack 10 is held in the case member 200 by being pressed between the end wall part 220 and the end panel 250. Furthermore, the compression reaction force of the battery stack 10 presses the end panel 250 against the third mounting-shape part 233 in a direction away from the end wall part 220, so that the end panel 250 is fixed in place. The battery pack 1 produced as above includes no components that need to be adjusted in length according to variations in the length of the battery stack 10 in the stacking direction. Consequently, the battery pack 1 enabling reduction in cost and the method for producing such a battery pack 1 can be achieved.

The foregoing embodiments and examples are merely exemplified and give no limitation to the present disclosure. The present disclosure may be embodied in other specific forms without departing from the essential characteristics thereof.

For example, in the above embodiment, the mounting-shape part in which an end panel is to be mounted is configured with three grooves, namely, the first mounting-shape part 231, the second mounting-shape part 232, and the third mounting-shape part 233. However, the number and the shape of the mounting-shape part may be changed as needed.

In the foregoing embodiment, the mounting-shape part in which the end panel 250 to be mounted is selected as one located at the position where the interval between the battery stack 10 in the compressed state and the end panel 250 is the smallest. As an alternative, the mounting-shape part in which the end panel 250 to be mounted has only to be located at a position where the battery stack 10 in the battery pack 1 can be compressed to a desired degree. Specifically, the relationship between the position of the mounting-shape part for mounting the end panel 250 and the length of the compressed battery stack 10 in the stacking direction can be determined in advance. Accordingly, in producing the battery pack 1, the length of the compressed battery stack 10 in the stacking direction is detected and, referring to the above predetermined relationship, the position of the mounting-shape part for mounting the end panel 250 is determined based on a detection value indicating the detected length of the compressed battery stack 10. In other words, the mounting-shape part in which the end panel 250 is to be mounted is any mounting-shape part, which is at least partly hidden by the battery stack 10 in the uncompressed state, whereas is exposed when the battery stack 10 is in the compressed state.

The foregoing embodiment shows the configuration that each spacer 150 of the battery stack 10 is provided with the aligning protrusions 155 and the floor part 210 of the case member 200 is provided with the aligning grooves 240. An alternative may be configured, for example, such that the spacers 150 are each provided with a groove or grooves and the floor part 210 is correspondingly provided with a protrusion or protrusions. The engagement part of the battery stack 10, which engages with the shape of the floor part 210, has only to be configured to position the battery cells 100 in the width direction and may be provided to any components other than the spacers 150. Specifically, it is essential only that the floor part 210 of the case member 200 is formed with an aligning-shape part for aligning the battery cells 100 of the battery stack 10, while the battery stack 10 includes an engagement member for each of the battery cells 100, the engagement member being configured to engage with the aligning-shape part.

Figure 10:
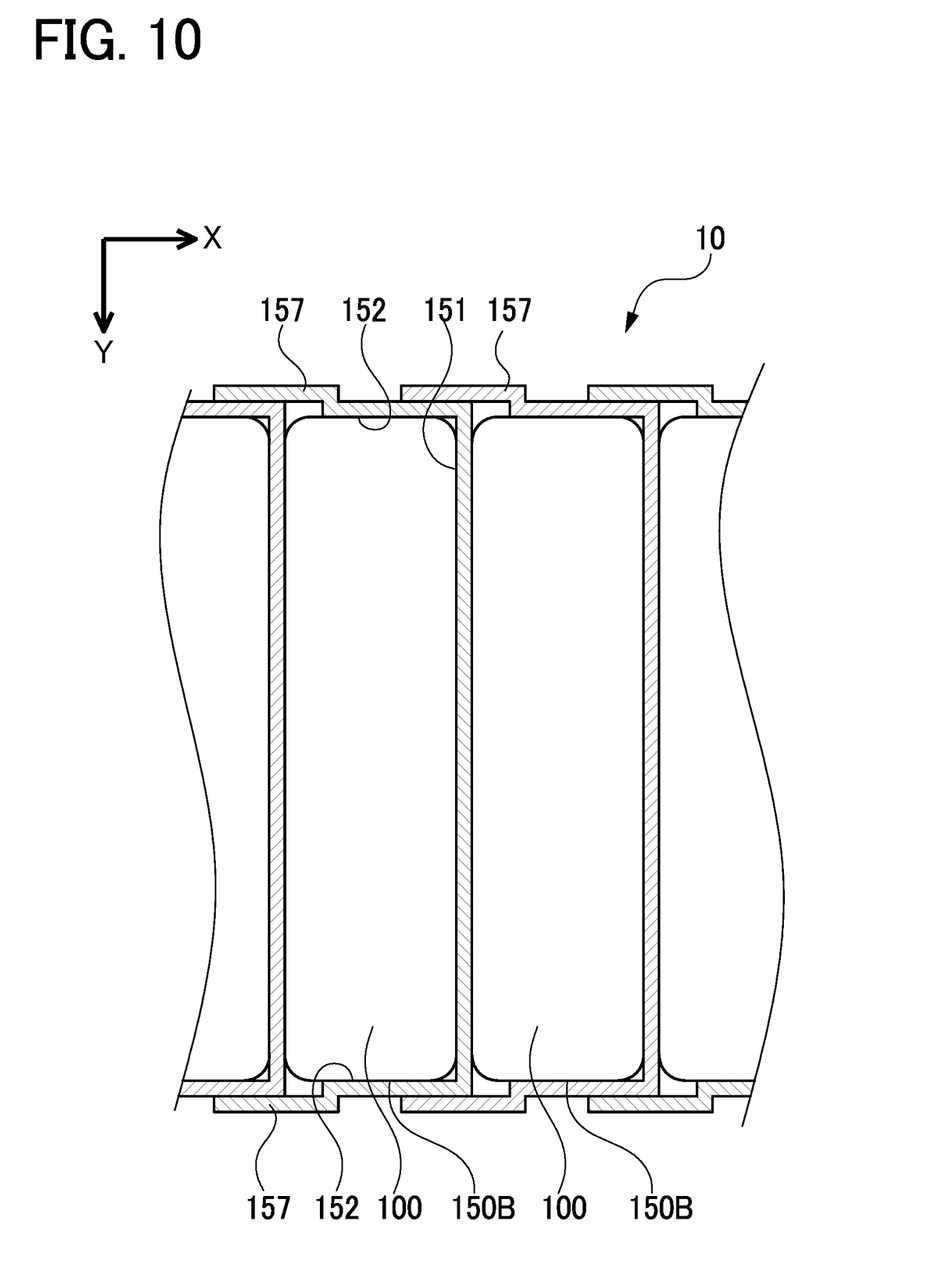
FIG. 10 is an explanatory view showing a modified example of a structure of the battery stack.

The foregoing embodiment exemplifies that the battery cells 100 of the battery stack 10 are aligned in the equipment before insertion into the case member 200. Alternatively, the battery cells 100 of the battery stack 10 may be aligned by the configuration of the battery stack 10 itself before insertion in the case member 200. A concrete example of such an additional configuration of the battery stack 10 that can align the battery cells 100 is illustrated in FIG. 10. FIG. 10 is a cross-sectional view of the battery stack 10, horizontally taken, including spacers 150B in a modified example. Each spacer 150B has the same shape as the spacer 150 and additionally includes a positioning part 157. This positioning part 157 extends to an adjacent spacer 150B in the battery stack 10 so that the adjacent spacer 150B is fitted in the positioning spacer 157. The spacers 150B can thus position the battery cells 100 each assembled to a corresponding recessed portion 151 and the adjacent spacers 150B in the width direction. The adjacent battery cells 100 can therefore be aligned with each other in the stacking direction. The spacers may be configured to enable the adjacent battery cells 100 to be fitted in each spacer from both sides thereof.

The foregoing embodiment may be applied to any types of batteries (nickel metal hydride battery, lithium-ion battery, etc.) without particular limitations.

The battery pack according to the present disclosure may be configured such that the mounting-shape part of the case member includes a plurality of mounting-shape parts that are located at a plurality of positions on the opposite end of the case member from the end wall part, and the end panel is mounted in one of the plurality of mounting-shape parts. With the above configuration, the position of the end panel is appropriately adjusted according to individual differences among battery stacks in the length in the stacking direction. No special components and processes are required to adjust the position of the end panel according to the individual differences among battery stacks in the length in the stacking direction. Therefore, even when the battery stacks have large individual differences in the length in the stacking direction, the battery pack including such battery stacks is produced at low costs.

Furthermore, the battery pack according to the present disclosure may be configured such that the floor part includes an aligning-shape part configured to align the battery cells of the battery stack in the stacking direction, and the battery stack further includes an engagement member for each of the battery cells, the engagement member being configured to engage with the aligning-shape part. With the above configuration, the battery pack can be configured with the battery cells aligned in the stacking direction with an inexpensive structure using the aligning-shape part and the engagement member.

Moreover, the production method of the battery pack according to the present disclosure may be configured such that the mounting-shape part of the case member includes a plurality of mounting-shape parts that are located at a plurality of positions on the opposite end of the case member from the end wall part, and the pressing of the battery stack against the end wall part is performed by moving forward the battery stack from a side of the mounting-shape part toward the end wall part, the compressing of the battery stack is performed until at least a part of the plurality of mounting-shape parts, which is hidden by the battery stack before the battery stack is compressed, becomes exposed, and the mounting is performed by mounting the end panel in one of the mounting-shape parts, which is exposed when the battery stack is compressed. According to the method configured as above, the position of the end panel can be appropriately adjusted according to the individual differences among the battery stacks in length in the stacking direction. No special components and processes are required to adjust the position of the end panel according to the individual differences among the battery stacks in length in the stacking direction. Therefore, even when the battery stacks have large individual differences in length in the stacking direction, the present method can produce the battery pack including such battery stacks at low costs.

Furthermore, the production method of the battery pack according to the present disclosure may be configured such that the floor part of the case member includes an aligning-shape part configured to align the battery cells of the battery stack in the stacking direction, the battery stack further includes an engagement member for each of the battery cells, the engagement member being configured to engage with the aligning-shape part, and the pressing of the battery stack against the end wall part is performed while bringing the engagement member and the aligning-shape part into engagement with each other. According to the method configured as above, the battery pack with the battery cells aligned in the stacking direction can be produced with an inexpensive cost using the aligning-shape part and the engagement member. No special process is required to align the battery cells in the stacking direction, which can achieve low costs for producing the battery pack.

REFERENCE SIGNS LIST

1 Battery pack
10 Battery stack
100 Battery cell
150 Spacer (Engagement member)
155 Aligning protrusion
200 Case member
210 Floor part
220 End wall part
230 Mounting part
231 First mounting-shape part (Mounting-shape part)
232 Second mounting-shape part (Mounting-shape part)
233 Third mounting-shape part (Mounting-shape part)
240 Aligning groove (Aligning-shape part)
250 End panel

What is claimed is:
1. A battery pack comprising:
a battery stack including a plurality of battery cells stacked one on another;

a case member in which the battery stack is housed, the case member including:
  a floor part located under the battery stack,
  an end wall part located on one end in a stacking direction of the battery cells, the end wall part being continuously integrated with the floor part, and
  a mounting-shape part located on an end opposite from the end wall part, the mounting-shape part being configured to mount a panel-shaped member; and
an end panel, which is the panel-shaped member, mounted in the mounting-shape part; wherein
the battery stack is retained in the case member while being held by compression between the end wall part and the end panel,
the end panel is pressed against the mounting-shape part in a direction away from the end wall part by compression reaction force of the battery stack, so that the end panel is fixed in the mounting-shape part,
the mounting-shape part of the case member includes a plurality of mounting-shape parts that are located at a plurality of positions on the opposite end of the case member from the end wall part, and
the end panel is mounted in one of the plurality of mounting-shape parts.

2. A battery pack comprising:
a battery stack including a plurality of battery cells stacked one on another;
a case member in which the battery stack is housed, the case member including:
  a floor part located under the battery stack,
  an end wall part located on one end in a stacking direction of the battery cells, the end wall part being continuously integrated with the floor part, and
  a mounting-shape part located on an end opposite from the end wall part, the mounting-shape part being configured to mount a panel-shaped member; and
an end panel, which is the panel-shaped member, mounted in the mounting-shape part; wherein
the battery stack is retained in the case member while being held by compression between the end wall part and the end panel,
the end panel is pressed against the mounting-shape part in a direction away from the end wall part by compression reaction force of the battery stack, so that the end panel is fixed in the mounting-shape part,
each of the battery cells includes a terminal on an upper surface of the battery cell,
the floor part includes an aligning-shape part configured to align the battery cells of the battery stack in the stacking direction, and
the battery stack further includes an engagement member for each of the battery cells, the engagement member being configured to engage with the aligning-shape part.

3. The battery pack according to claim 1, wherein
the floor part includes an aligning-shape part configured to align the battery cells of the battery stack in the stacking direction, and
the battery stack further includes an engagement member for each of the battery cells, the engagement member being configured to engage with the aligning-shape part.

4. A method for producing a battery pack, the battery pack comprising a battery stack including a plurality of battery cells and a case member in which the battery stack is housed, the case member including:
  a floor part located under the battery stack;
  an end wall part located on one end in a stacking direction of the battery cells, the end wall part being continuously integrated with the floor part; and
  a mounting-shape part located on an end opposite from the end wall part, the mounting-shape part being configured to mount a panel-shaped member;
the method comprising:
inserting the battery stack into the case member while compressing the battery stack in the stacking direction, and pressing one end of the battery stack in the stacking direction against the end wall part;
mounting an end panel in the mounting-shape part; and
releasing the battery stack from the compressing to allow an opposite end of the battery stack in the stacking direction to press against the end panel so that:
  the battery stack is housed in the case member while being held by compression between the end wall part and the end panel, and
  the end panel is pressed against the mounting-shape part in a direction away from the end wall part by compression reaction force of the battery stack, and is fixed in the mounting-shape part; wherein
the mounting-shape part of the case member includes a plurality of mounting-shape parts that are located at a plurality of positions on the opposite end of the case member from the end wall part,
the pressing of the battery stack against the end wall part is performed by moving forward the battery stack from a side of the mounting-shape part toward the end wall part,
the compressing of the battery stack is performed until at least a part of the plurality of mounting-shape parts, which is hidden by the battery stack before the battery stack is compressed, becomes exposed, and
the mounting is performed by mounting the end panel in one of the mounting-shape parts, which is exposed when the battery stack is compressed.

5. A method for producing a battery pack, the battery pack comprising a battery stack including a plurality of battery cells and a case member in which the battery stack is housed, the case member including:
  a floor part located under the battery stack;
  an end wall part located on one end in a stacking direction of the battery cells, the end wall part being continuously integrated with the floor part; and
  a mounting-shape part located on an end opposite from the end wall part, the mounting-shape part being configured to mount a panel-shaped member;
the method comprising:
inserting the battery stack into the case member while compressing the battery stack in the stacking direction, and pressing one end of the battery stack in the stacking direction against the end wall part;
mounting an end panel in the mounting-shape part; and
releasing the battery stack from the compressing to allow an opposite end of the battery stack in the stacking direction to press against the end panel so that:
  the battery stack is housed in the case member while being held by compression between the end wall part and the end panel, and
the end panel is pressed against the mounting-shape part in a direction away from the end wall part by compression reaction force of the battery stack, and is fixed in the mounting-shape part; wherein
each of the battery cells includes a terminal on an upper surface of the battery cell, the floor part of the case member includes an aligning-shape part configured to align the battery cells of the battery stack in the stacking direction, the battery stack further includes an engagement member for each of the battery cells, the engagement member being configured to engage with the aligning-shape part, and the pressing of the battery stack against the end wall part is performed while bringing the engagement member and the aligning-shape part into engagement with each other.

6. The method for producing a battery pack according to claim 4, wherein the floor part of the case member includes an aligning-shape part configured to align the battery cells of the battery stack in the stacking direction, the battery stack further includes an engagement member for each of the battery cells, the engagement member being configured to engage with the aligning-shape part, and the pressing of the battery stack against the end wall part is performed while bringing the engagement member and the aligning-shape part into engagement with each other.

* * * * *